United States Patent [19]

Kato et al.

[11] Patent Number: 5,013,695
[45] Date of Patent: May 7, 1991

[54] DIELECTRIC CERAMIC COMPOSITION

[75] Inventors: Hiroshi Kato; Shinsuke Yano; Toshio Nonomura; Susumu Nishigaki, all of Nagoya, Japan

[73] Assignee: Narumi China Corporation, Nagoya, Japan

[21] Appl. No.: 354,564

[22] Filed: May 22, 1989

[30] Foreign Application Priority Data

May 24, 1988 [JP] Japan .................. 63-126353

[51] Int. Cl.$^5$ .............................. C04B 35/46
[52] U.S. Cl. .................... 501/139; 501/136
[58] Field of Search .................. 501/136, 139

[56] References Cited

U.S. PATENT DOCUMENTS

| | | | |
|---|---|---|---|
| 2,985,700 | 5/1961 | Johnston | 501/136 |
| 3,775,142 | 11/1973 | Roup | 501/136 |
| 3,819,990 | 6/1974 | Hayashi et al. | 501/139 |
| 3,988,498 | 10/1976 | Maher | 501/139 |
| 4,242,213 | 12/1980 | Tamura et al. | 501/136 |
| 4,753,906 | 6/1988 | Nishigaki et al. | 501/139 |

FOREIGN PATENT DOCUMENTS

| | | | |
|---|---|---|---|
| 0219895 | 4/1987 | European Pat. Off. | |
| 0252248 | 1/1988 | European Pat. Off. | |
| 56-82501 | 7/1981 | Japan | |
| 56-134562 | 10/1981 | Japan | |
| 1151062 | 12/1984 | Japan | 501/136 |

OTHER PUBLICATIONS

World Patent Index for JP56-134562.
World Patent Index for JP56-082501.
Chemical Abstracts, vol. 102, No. 22, Jun. 1985, p. 764, Abstract No. 19647z.
Chemical Abstracts, vol. 68, No. 24, 1968, p. 10523, Abstract No. 10885p.
Jour. of Materials Science, vol. 23, No. 3, Mar. 1988, pp. 1083-1089, "Effects of Aluminum on the Electrical and Mechanical Properties of PTCR BATiO3 Ceramics as a Function of the Sintering Temperature".

*Primary Examiner*—William R. Dixon, Jr.
*Assistant Examiner*—Melissa Bonner
*Attorney, Agent, or Firm*—Sughrue, Mion, Zinn, Macpeak & Seas

[57] ABSTRACT

A dielectric ceramic composition consisting essentially of barium oxide, titanium oxide, neodymium oxide and gadolinium oxide and which is expressed by the formula:

$$aBaO\cdot bTiO_2\cdot c[(1-X)Nd_2O_3 - XGd_2O_3]$$

wherein, $0.10 \leq a \leq 0.20$, $0.65 \leq b \leq 0.75$, $0.10 \leq c \leq 0.20$, $a+b+c=1$ (a, b, and c are mole fractions), and $0 < X \leq 0.4$ (X is a mole fraction of $Gd_2O_3$ based on the total amount of $Nd_2O_3$ and $Gd_2O_3$).

$Al_2O_3$ may be added in an amount of not more than 4 parts by weight to 100 parts by weight of the dielectric ceramic composition.

4 Claims, 1 Drawing Sheet

DIELECTRIC CERAMIC COMPOSITION

BACKGROUND OF THE INVENTION

The present invention relates to a dielectric ceramic composition for use in microwave communication and broadcasting equipment.

Recently, a dielectric material which has a large dielectric constant, a small dielectric loss, and a small value of temperature coefficient for resonant frequency (hereunder referred to as $\tau_f$) in microwave ranges has been used as a resonator in satellite broadcasting receivers and car telephones. Conventional dielectric ceramics for use in such applications include $BaO\text{-}TiO_2$ system ceramics, $BaO\text{-}CaO\text{-}TiO_2$ system ceramics, and the like.

Since the dimensions of a resonator are proportional to $1/(\epsilon_r)^{\frac{1}{2}}$ ($\epsilon_r$ is the specific inductive capacity of a dielectric material), it is possible to obtain a very small resonator by employing a material with a high value of $\epsilon_r$. For a $BaO\text{-}TiO_2$ or a $MgO\text{-}CaO\text{-}TiO_2$ system ceramic, the value of $\epsilon_r$ is 20–40. When a resonator made of these ceramics is used at the low-frequency end of the microwave range (close to 1 GHz), the disadvantage arises from the fact that the dimensions of the resonator become large.

In order to satisfy a high demand for dielectric resonators which are operated at a frequency close to 1 GHz, it is necessary to use dielectric ceramic compositions which have a much higher dielectric constant. In addition, these resonators must have a high value of Q (Q is the reciprocal of dielectric loss, $\tan\delta$, i.e., $Q=1/\tan\delta$) and a low value of $\tau_f$.

Japanese Laid-Open Specification No. 134562/1981 discloses a dielectric ceramic composition of the $BaO\text{-}TiO_2\text{-}Nd_2O_3$ system which has a large $\epsilon_r$ ($>70$) and a high Q ($>2000$), but its $\tau_f$ is greater than 150 ppm/K which is not acceptable to practical use.

Japanese Laid-Open Specification No. 82501/1981 discloses a dielectric ceramic composition consisting of $BaO\text{-}TiO_2\text{-}Nd_2O_3$, oxide of rare earth metals, and optionally PbO, which has a large $\epsilon_r$ of 91, a high Q of 4200 (at 2GHz), and a small $\tau_f$ of 5 ppm/K when PbO is present. When it does not contain PbO, however, it has a small $\epsilon_r$ of about 50.

When the composition contains PbO, PbO evaporates during firing, and it is difficult to obtain a stable composition. Furthermore, the evaporated PbO may contaminate an apparatus such as a firing furnace, and cause difficulties to the subsequent manufacture of other ceramic compositions using the apparatus.

Another known dielectric ceramic composition which is free from PbO is the $BaO\text{-}TiO_2\text{-}Nd_2O_3\text{-}Sm_2O_3$ system. Since the system must have a high content of expensive $Sm_2O_3$ in order to obtain a small $\tau_f$, the resultant ceramic composition is quite expensive.

SUMMARY OF THE INVENTION

The purpose of the present invention is to provide dielectric materials which have a large dielectric constant, a high Q, and a small $\tau_f$ and which are free from the above-mentioned disadvantages of the prior art.

The present invention resides in a dielectric ceramic composition which consists essentially of barium oxide, titanium oxide, neodymium oxide and gadolinium oxide having the following formula:

$$aBaO\text{-}bTiO_2\text{-}c[(1-X)Nd_2O_3\text{-}XGd_2O_3] \quad (1)$$

wherein, $0.10 \leq a \leq 0.20$, $0.65 \leq b \leq 0.75$, $0.10 \leq c \leq 0.20$, $a+b+c=1$ (a, b, and c are mole fractions), and $0 < X \leq 0.4$ (X is a mole fraction of $Gd_2O_3$ based on the total amount of $Gd_2O_3$ and $Nd_2O_3$).

In another embodiment of the present invention, aluminum oxide in an amount of not more than 4 parts by weight may be added to 100 parts by weight of the above-described dielectric ceramic composition.

DESCRIPTION OF THE PREFERRED EMBODIMENTS

Figure 1:
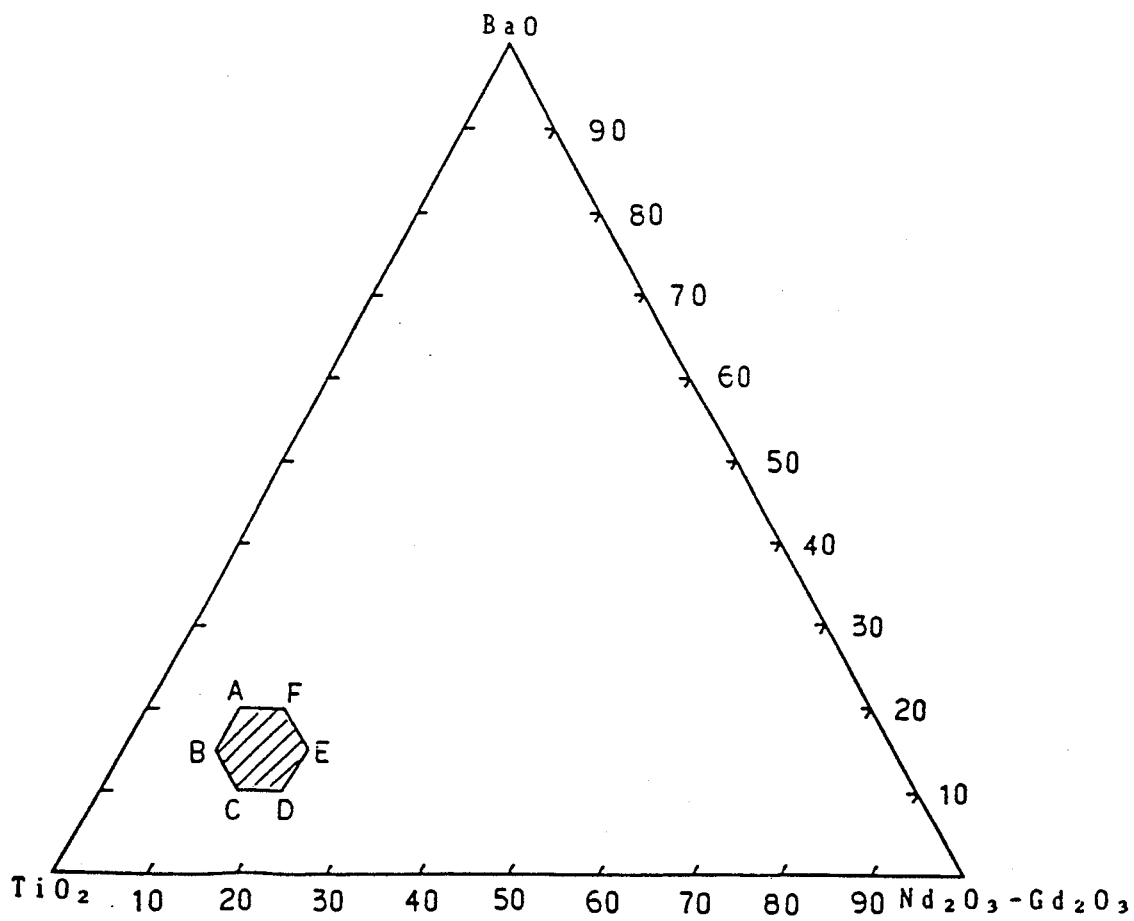
FIG. 1 is a ternary composition diagram in mole % showing the composition of the dielectric material of the present invention.

The ranges of the components of the ceramic composition of the present invention are illustrated in FIG. 1, in which the area confined by points A, B, C, D, E, and F defines the composition of the dielectric material of the present invention. The values of "a", "b", and "c" for each of the points A, B, C, D, E, and F are given in Table 1.

When "a" (mole fraction of BaO) is larger than 0.20, $\tau_f$ will increase. On the other hand, when "a" is smaller than 0.10, $\epsilon_r$ will decrease. Therefore, a desirable range of "a" is $0.10 \leq a \leq 0.20$.

When "b" (mole fraction of $TiO_2$) is larger than 0.75, $\tau_f$ will increase. On the other hand, when "b" is smaller than 0.65, Q will decrease, and sintering becomes difficult. Therefore, a desirable range for "b" is $0.65 \leq b \leq 0.75$.

When "c" (mole fraction of $Nd_2O_3\text{-}Gd_2O_3$) is larger than 0.20, Q will decrease, and when "c" is smaller than 0.10, $\tau_f$ will increase. Therefore, a desirable range of "c" is $0.10 \leq c \leq 0.20$.

In addition, when "X" is over 0.4, the value of Q will be much smaller. Therefore, a desirable range of "X" is $X \leq 0.40$.

One of the advantages of the present invention is that while keeping the value of $\epsilon_r$ substantially constant, the value of $\tau_f$ can be varied by replacement of a part of $Nd_2O_3$ by $Gd_2O_3$. In particular, the composition defined by the limited area shown in FIG. 1 can exhibit a larger $\epsilon_r$ and a smaller $\tau_f$ than those of the conventional $BaO\text{-}TiO_2\text{-}Nd_2O_3$ system.

Moreover, according to the present invention the value of Q can be increased and $\tau_f$ can be decreased by the addition of not more than 4 parts by weight of aluminum oxide to 100 parts by weight of the $BaO\text{-}TiO_2\text{-}(Nd_2O_3\text{-}Gd_2O_3)$ system dielectric ceramic composition.

In addition, the composition of the present invention does not contain PbO and similar relatively volatile component. Thus, the composition can be manufactured in a stable manner, and manufacturing equipment such as a firing furnace is kept substantially free of contamination. This is very advantageous from the viewpoint of production.

Furthermore, $Gd_2O_3$ is more effctive than $Sm_2O_3$ to obtain a small $\tau_f$. The replacement of $Sm_2O_3$ by a smaller amount of $Gd_2O_3$ will be enough to achieve a small $\tau_f$ on the same level.

It is also advantageous that the value of $\tau_f$ can be further decreased by the addition of a small amount of aluminum oxide.

TABLE 1

|   | a | b | c |
|---|---|---|---|
| A | 0.20 | 0.70 | 0.10 |
| B | 0.15 | 0.75 | 0.10 |
| C | 0.10 | 0.75 | 0.15 |
| D | 0.10 | 0.70 | 0.20 |
| E | 0.15 | 0.65 | 0.20 |
| F | 0.20 | 0.65 | 0.15 |

The present invention provides a dielectric ceramic composition exhibiting a large value of $\epsilon_r$, a rather high value of Q, and a small value of $\tau_f$, and the composition is particularly suitable for use in a dielectric ceramic device for microwave equipment, such as a satellite broadcasting receiver or a car telephone.

Furthermore, according to the present invention, since a volatile component such as PbO is not used during manufacture, the properties of the resulting composition can be stabilized, and there is no harmful effect on or contamination of either the firing furnace or other ceramic compositions in neighboring production lines.

It is also to be noted that the product of the present invention is economical, since it does not use $Sm_2O_3$, which is much more expensive than $Gd_2O_3$.

The present invention will be further described in conjunction with some working examples, which are presented merely for illustrative purposes.

EXAMPLES

Examples A $BaCO_3$, $TiO_2$, $Nd_2O_3$, and $Gd_2O_3$, each of a high degree of purity, were used as starting materials and were weighed to give a predetermined composition. The weighed starting materials were mixed and pulverized in water containing alumina balls.

The resultant slurry was suction-filtered and then dried. The dried powder was calcined at a temperature of 900°–1100° C. for 1–6 hours in the air atmosphere. After calcination, the calcined mass was subjected to wet-crushing in water containing alumina balls. The crushed powder was collected by suction filtration and dried.

A binding agent was added thereto, and the resulting mixture was granuled through a 48-mesh screen. The granules were formed with a press at 1000 kgf/cm$^2$ into an article having a diameter of 16 mm and a thickness of about 6 mm, and the green article was then fired at 1300°–1450° C. on a platinum plate.

The resultant dielectric ceramic material was examined with respect to its specific inductive capacity ($\epsilon_r$) at 3 GHz, Q, and its temperature coefficient of resonant frequency ($\tau_f$) at $-25°$ C.$-+75°$ C.

The results of the experiments are shown in Table 2 with those of Comparative Examples in which $Sm_2O_3$ was used in place of $Gd_2O_3$ (Comparative Examples Nos. 1 and 2) or no $Gd_2O_3$ was added (Comparative Example No. 3).

The values of $\epsilon_r$ and $\tau_f$ do not depend on frequency, but the value of Q is inversely related to frequency, i.e., the product of Q and the frequency is always constant. Therefore, the value of Q determined at 1 GHz is three times larger than that determined at 3 GHz.

The decrease in the value of $\tau_f$ caused by the addition of $Gd_2O_3$ will be apparent by comparing the results for Comparative Example No. 3 with those for Working Example No. 29. The value of $\tau_f$ decreases to 3 ppm/K from 47 ppm/K by the replacement of 30 mole % of $Nd_2O_3$ by $Gd_2O_3$.

The effect of the partial replacement of $Nd_2O_3$ by $Gd_2O_3$ is apparent by comparing Working Examples Nos. 18, 20, 22, and 24 in which the mole fraction of $Gd_2O_3$ varied from 0.1 to 0.4 by increments of 0.1. The value of $\tau_f$ decreases to 2 ppm/K from 29 ppm/K, and at the same time, the value of Q also decreases to 1040 from 2960. The mole fraction of replacement by $Gd_2O_3$ (X) is limited to 0.4 or less, since at X=0.4 the value of Q decreases to a rather low value of 1040.

The influence of the amount of $TiO_2$ is apparent by comparing Working Examples 1 with 3. The value of Q increases with the amount of TiO, and value of $\tau_f$ increases and finally reaches an impractical value. On the other hand, when the value of "b" is smaller than 0.65, it is difficult to carry out sintering. Therefore, the range of "b" is defined as $0.65 \leq b \leq 0.75$.

Example B

In Working Examples Nos. 2, 7–11, 13–17, 19, 21, 23, 25–27, 31, 32, 34–38, 40, and 41, $Al_2O_3$ is included.

$Al_2O_3$ in the amount indicated in Table 2 was added to 100 parts by weight of $BaO$-$TiO_2$-($Nd_2O_2$-$Gd_2O_3$) to prepare a dielectric ceramic material in the same manner as in Example A. Properties of the resulting material are shown in Table 2.

The effect of the addition of $Al_2O_3$ is apparent from Table 2. Namely, by comparing the results of Working Examples 18 with 19, 20 with 21, and so on, it is noted that the addition of $Al_2O_3$ in an amount of 1.5 parts by weight increases the value of Q with decreasing the value of $\tau_f$. In contrast, in Working Examples 6–11, 12–17 and 33–38, it is apparent that the value of Q increases with the amount of added $Al_2O_3$ increasing from zero to 1.5 parts by weight, and then gradually decreases with addition of $Al_2O_3$ over 1.5 parts by weight. However, the value of $\epsilon_r$ gradually decreases due to the addition of $Al_2O_3$, and $\epsilon_r$ is about 58 in Example 38. Thus, the upper limit of the amount added $Al_2O_3$ is restricted to 4.0 parts by weight.

Furthermore, when $Al_2O_3$ is added in accordance with the present invention, as shown in Working Examples 17, 25, and 38, $\tau_f$ is $-22$, $-16$, and $-11$ ppm/K. Such a negative $\tau_f$ is unobtainable for the $BaO$-$TiO_2$-($Nd_2O_3$-$Gd_2O_3$) system.

In addition, the value of $\tau_f$ is 3 for both Examples 29 and 9 and Q can be increased greatly from 1800 to 3360 by the addition of 1.5 parts by weight of $Al_2O_3$.

As is apparent from the foregoing, according to the present invention, properties of the dielectric ceramic composition can be changed depending on the values of a, b, c, and X, and the amount of $Al_2O_3$. The desired properties can be achieved by properly changing each of the values of these factors. As described previously, it is desired that the values of $\epsilon_r$ and Q be large, and that $\tau_f$ be small. It is preferred that these parameters have the following values:

$\epsilon_r \geq 58$
Q > 1000 (at 3 GHz)
$\tau_f <$ 100 ppm/K.

It can be seen from the results of Table 2 that the dielectric ceramic composition of the present invention can generally achieve the above preferred values for these parameter.

In a preferred embodiment, the coefficients of Formula (1) are as follows:

$0.10 \leq a \leq 0.15$,
$0.65 \leq b \leq 0.70$,
$0.15 \leq c \leq 0.20$,
$0.00 < X \leq 0.30$, and
$0 \leq Al_2O_3 \leq 4$ parts by weight (per each 100 parts by weight of $BaO\text{-}TiO_2\text{-}(Nd_2O_3\text{-}Gd_2O_3)$ system dielectric ceramic composition).

In this case, the dielectric ceramic compositions generally possess the following more preferable properties, if necessary, by addition of $Al_2O_3$ within the above range:

$\epsilon_r \geq 60$
$Q >$ about 2000 (at 3 GHz)
$\tau_f \leq 20$ ppm/K.

Although the invention has been described with preferred embodiments it is to be understood that variations and modifications may be employed without departing from the concept of the invention defined in the following claims.

We claim:

1. A dielectric ceramic composition consisting essentially of barium oxide, titanium oxide, neodymium oxide and gadolinium oxide and expressed by the formula:

$$aBaO\text{-}bTiO_2\text{-}c[(1-X)Nd_2O_3\text{-}XGd_2O_3]$$

wherein, $0.10 \leq a \leq 0.20$, $0.65 \leq b \leq 0.75$, $0.10 \leq c \leq 0.20$, $a+b+c=1$ (a, b, and c are mole fractions), and $0 < X \leq 0.4$ (X is a mole fraction of $Gd_2O_3$ based on the total amount of $Nd_2O_3$ and $Gd_2O_3$).

2. A dielectric ceramic composition as defined in claim 1, wherein
$0.10 \leq a \leq 0.15$,
$0.65 \leq b \leq 0.70$,
$0.15 \leq c \leq 0.20$, and
$0.00 < X \leq 0.30$.

3. A dielectric ceramic composition consisting essentially of not more than 4 parts by weight of aluminum oxide and 100 parts by weight a composition which is expressed by the formula:

$$aBaO\text{-}bTiO_2\text{-}c[(1-X)Nd_2O_3\text{-}XGd_2O_3]$$

TABLE 2

| Run No. | Composition (mole fraction) a | b | c | x | $Al_2O_3$** (parts by weight) | $\epsilon_r$ | Q (3 GHz) | $\tau_f$ (ppm/K) |
|---|---|---|---|---|---|---|---|---|
| Present Invention | | | | | | | | |
| 1 | 0.10 | 0.75 | 0.15 | 0.2 | 0 | 76 | 2550 | 88 |
| 2 | 0.10 | 0.75 | 0.15 | 0.2 | 1.5 | 60 | 2610 | 54 |
| 3 | 0.10 | 0.70 | 0.2 | 0.2 | 0 | 66 | 1350 | 11 |
| 4 | 0.125 | 0.69 | 0.185 | 0.2 | 0 | 75 | 1810 | 13 |
| 5 | 0.135 | 0.675 | 0.19 | 0.2 | 0 | 77 | 1510 | −1 |
| 6 | 0.14 | 0.68 | 0.18 | 0.1 | 0 | 83 | 2390 | 22 |
| 7 | 0.14 | 0.68 | 0.18 | 0.1 | 0.5 | 77 | 3154 | 16 |
| 8 | 0.14 | 0.68 | 0.18 | 0.1 | 1.0 | 73 | 3310 | 10 |
| 9 | 0.14 | 0.68 | 0.18 | 0.1 | 1.5 | 69 | 3360 | 3 |
| 10 | 0.14 | 0.68 | 0.18 | 0.1 | 2.0 | 66 | 2160 | −3 |
| 11 | 0.14 | 0.68 | 0.18 | 0.1 | 3.0 | 61 | 1890 | −9 |
| 12 | 0.14 | 0.68 | 0.18 | 0.2 | 0 | 80 | 2070 | 7 |
| 13 | 0.14 | 0.68 | 0.18 | 0.2 | 0.5 | 77 | 2420 | 5 |
| 14 | 0.14 | 0.68 | 0.18 | 0.2 | 1.0 | 72 | 2460 | 1 |
| 15 | 0.14 | 0.68 | 0.18 | 0.2 | 1.5 | 67 | 2480 | −5 |
| 16 | 0.14 | 0.68 | 0.18 | 0.2 | 2.0 | 64 | 1930 | −11 |
| 17 | 0.14 | 0.68 | 0.18 | 0.2 | 3.0 | 60 | 1850 | −22 |
| 18 | 0.14 | 0.685 | 0.175 | 0.1 | 0 | 83 | 2960 | 29 |
| 19 | 0.14 | 0.685 | 0.175 | 0.1 | 1.5 | 71 | 3820 | 12 |
| 20 | 0.14 | 0.685 | 0.175 | 0.2 | 0 | 81 | 2320 | 18 |
| 21 | 0.14 | 0.685 | 0.175 | 0.2 | 1.5 | 71 | 2837 | −3 |
| 22 | 0.14 | 0.685 | 0.175 | 0.3 | 0 | 81 | 1780 | 8 |
| 23 | 0.14 | 0.685 | 0.175 | 0.3 | 1.5 | 70 | 2490 | −13 |
| 24 | 0.14 | 0.685 | 0.175 | 0.4 | 0 | 81 | 1040 | 2 |
| 25 | 0.14 | 0.685 | 0.175 | 0.4 | 1.5 | 70 | 1370 | −16 |
| 26 | 0.14 | 0.67 | 0.19 | 0.1 | 0.5 | 75 | 2060 | 4 |
| 27 | 0.14 | 0.67 | 0.19 | 0.1 | 1.5 | 68 | 1960 | −9 |
| 28 | 0.14 | 0.675 | 0.185 | 0.2 | 0 | 75 | 1600 | 12 |
| 29 | 0.145 | 0.68 | 0.175 | 0.3 | 0 | 82 | 1800 | 3 |
| 30 | 0.15 | 0.75 | 0.10 | 0.2 | 0 | 71 | 2880 | 51 |
| 31 | 0.15 | 0.75 | 0.10 | 0.2 | 0.5 | 68 | 2750 | 44 |
| 32 | 0.15 | 0.75 | 0.10 | 0.2 | 1.5 | 66 | 2530 | 43 |
| 33 | 0.15 | 0.70 | 0.15 | 0.2 | 0 | 81 | 2420 | 32 |
| 34 | 0.15 | 0.70 | 0.15 | 0.2 | 0.5 | 77 | 2430 | 21 |
| 35 | 0.15 | 0.70 | 0.15 | 0.2 | 1.5 | 73 | 2330 | 18 |
| 36 | 0.15 | 0.70 | 0.15 | 0.2 | 3.0 | 64 | 2230 | −3 |
| 37 | 0.15 | 0.70 | 0.15 | 0.2 | 3.5 | 62 | 2020 | −7 |
| 38 | 0.15 | 0.70 | 0.15 | 0.2 | 4.0 | 58 | 1990 | −11 |
| 39 | 0.20 | 0.70 | 0.10 | 0.2 | 0 | 73 | 2270 | 63 |
| 40 | 0.20 | 0.70 | 0.10 | 0.2 | 0.5 | 68 | 2140 | 46 |
| 41 | 0.20 | 0.70 | 0.10 | 0.2 | 1.5 | 64 | 1970 | 38 |
| Comparative | | | | | | | | |
| 1 | 0.20 | 0.685 | 0.175 | 0.4* | 0 | 81 | 3340 | 13 |
| 2 | 0.20 | 0.685 | 0.175 | 0.5* | 0 | 79 | 3400 | 3 |
| 3 | 0.145 | 0.68 | 0.175 | 0 | 0 | 86 | 3500 | 47 |

Note:
*$Sm_2O_3$ was added in place of $Gd_2O_3$.
**Parts by weight to 100 parts by weight of $BaO\text{-}TiO_2\text{-}(Nd_2O_3\text{-}Gd_2O_3)$ wherein, $0.10 \leq a \leq 0.20$, $0.65 \leq b \leq 0.75$, $0.10 \leq c \leq 0.20$, $a+b+c=1$ (a, b, and c are mole fractions), and $0 < X \leq 0.4$ (X is a mole fraction of $Gd_2O_3$ based on the total amount of $Nd_2O_3$ and $Gd_2O_3$).

4. A dielectric ceramic composition as defined in claim 3, wherein $0.10 \leq a \leq 0.15$,
$0.65 \leq b \leq 0.70$,
$0.15 \leq c \leq 0.20$,
$0.00 < X \leq 0.30$, and
$0 < Al_2O_3 \leq 4$ parts by weight (per each 100 parts by weight of $BaO\text{-}TiO_2\text{-}(Nd_2O_3\text{-}Gd_2O_3)$ system dielectric ceramic composition).

* * * * *